United States Patent [19]
Burkart et al.

[11] 4,247,034
[45] Jan. 27, 1981

[54] METHOD OF INDIRECTLY CONNECTING TWO PARTS

[75] Inventors: Klaus Burkart, Immenstadt; Manfred Wintzer, Unterpfaffenhofen, both of Fed. Rep. of Germany

[73] Assignee: Siemens Aktiengesellschaft, Berlin & Munich, Fed. Rep. of Germany

[21] Appl. No.: 928,683

[22] Filed: Jul. 27, 1978

[30] Foreign Application Priority Data

Sep. 23, 1977 [DE] Fed. Rep. of Germany ....... 2742922

[51] Int. Cl.³ .............................................. B23K 20/16
[52] U.S. Cl. ..................................... 228/116; 228/121; 228/263 A; 228/221; 228/233
[58] Field of Search ............... 228/116, 121, 124, 221, 228/263 A, 233

[56] References Cited

U.S. PATENT DOCUMENTS

| | | | |
|---|---|---|---|
| 3,921,885 | 11/1975 | Knox | 228/116 |
| 4,011,982 | 3/1977 | Marancik | 228/221 X |
| 4,051,582 | 10/1977 | Eschler et al. | 228/121 X |
| 4,196,837 | 4/1980 | Burkart et al. | 228/116 |

FOREIGN PATENT DOCUMENTS 2253913  5/1973  Fed. Rep. of Germany.
2162743  6/1973  France.

Primary Examiner—Kenneth J. Ramsey
Attorney, Agent, or Firm—Hill, Van Santen, Steadman, Chiara & Simpson

[57] ABSTRACT

Two parts, such as a quartz part and piezo-electric part, are indirectly connected to one another by applying relatively thin metallic layers having a thickness of about 0.5 nm to 55 nm under vacuum conditions onto the surfaces of such parts to be joined and then without ventilation of the vacuum-chamber contacting the free surfaces of such metallic layers with one another under the maintained vacuum conditions whereby a substantially permanent bond is formed between such layer.

7 Claims, 8 Drawing Figures

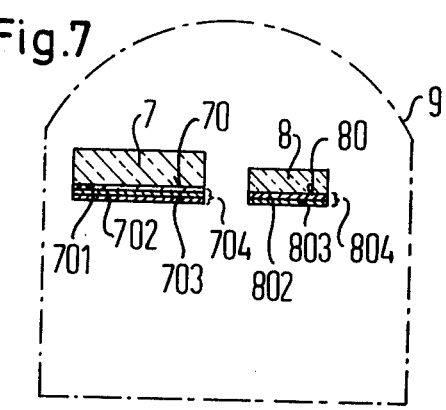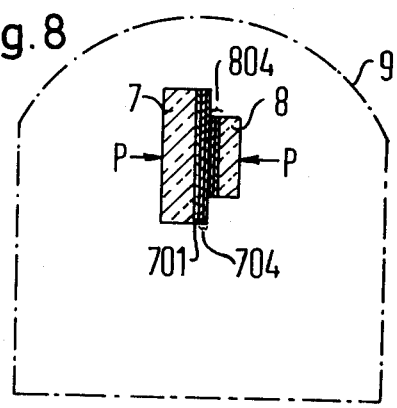

METHOD OF INDIRECTLY CONNECTING TWO PARTS

BACKGROUND OF THE INVENTION

1. Field of the Invention

The invention relates to a method of indirectly connecting two parts and somewhat more particularly to such a method whereby two metallic layers are applied under vacuum to the surfaces to be connected and are then brought into contact with one another without ventilation under the maintained vacuum to form the desired bond.

2. Prior Art

German Publication Application (DT-OS) No. 2,253,913 discloses a method of indirectly connecting two parts by applying, under vacuum, metallic layers on the surfaces to be connected and forcing such layers against one another to form a bond. In this method, an acousto-optical building component comprised of, for example, quartz is joined with an electro-mechanical converter, such as a piezo-electric structure so that the resultant structure comprises an acoustical light deflection system. In order to achieve the desired bond between such parts, two consecutive metallic layers are provided on such parts. A first layer is composed of gold and chromium and the other layer is composed of indium. The metals forming such layers are vaporized from suitable sources within a vacuum chamber and are deposited on the surfaces of the respective parts to be connected, which are then bonded to one another via such layers. In this system, the layer composed of gold and chromium has a thickness of a few thousand Angstrom units and the indium layer is of approximately the same thickness. After such metallic layers have been applied to the respective surface to be joined, the free surfaces of the respective indium layers are brought into contact against one another and compressed under vacuum for a few minutes at a pressure of about 2,800 to 3,500 N/cm² (Newtons per square centimeter) so that such indium layers and the parts supporting such layers become interconnected by cold welding.

However, if parts consisting of a pressure-sensitive material are to be so-joined with one another or with some other part, a substantial danger exists that destruction or damage to such parts might occur at the relatively high pressures required to accomplish such cold welding or bonding. Such a danger exists, for example, in attempting to cold weld an acousto-optical building component consisting of lead molybdate or an electro-mechanical converter composed of lithium niobate.

Another method of producing acoustical light deflector systems is suggested by French Pat. No. 2,162,743 wherein an acousto-optical component composed of, for example, lead molybdate is directly connected with an electro-acoustical transducer composed of, for example, lithium niobate. In this system, a plurality of metallic layers, comprised of a titanium layer having a thickness of about 200 Angstroms, a titanium-gold layer having a thickness of about 200 Angstroms, a gold layer having a thickness of about 3,000 Angstroms are consecutively provided, as by vaporization on one another, on the surfaces to be joined in a vacuum chamber. Subsequently, such metallic layers having a combined thickness of about 6,400 Angstroms are welded or bonded together under vacuum whereby a temperature of about 60° C. (140° F.) and a pressure in the order of magnitude of about 2,000 N/cm² must be withstood. This pressure is below that suggested by the above DT-OS '913 for cold welding because by utilizing temperatures in the vicinity of 60° C., a kind of thermocompression welding occurs. However, an elevation of the welding temperature with only a slight reduction in pressure still presents a danger of damaging or destroying the parts to be joined. Further, stress fissures or the like may occur with such thermo-compression welding since the parts to be joined may have a different coefficients of heat expansion.

SUMMARY OF THE INVENTION

The invention provides an improved method of indirectly joining two parts which substantially overcomes the above prior art drawbacks and allows even parts or components consisting of pressure-sensitive materials to be indirectly and safely joined with one another without any danger of damage or destruction.

In accordance with the principles of the invention, a method of the initially described type is improved by providing metal layers having a thickness of about 0.5 to 55 nm (nanometers) onto the surfaces to be joined. The metal layer thicknesses utilized in the practice of the invention are dimensioned a factor of 10 below the thickness utilized in the prior art methods. As a result of such relatively thin metallic layers, such layers can be welded or bonded to each other, surprisingly, by mere contact with one another under vacuum conditions, particularly without any pressure or elevated temperature and provide an extremely safe and secure bond. This welding without any notable pressure occurs, however, only in the indicated range of thickness for the metal layers. With metal layers thicknesses below 0.5 nm, it is no longer possible to achieve a secure welded connection while with layer thicknesses above 55 nm, an undesirable high welding pressure or temperature must be utilized.

By following the principles of the invention, one not only achieves a saving of metal but one is also able to provide an extremely gentle treatment of the parts to be connected because the surfaces to be joined are not subjected to any stress, either mechanical or thermal. The indirect bond or connection provided in accordance with the principles of the invention is essentially, unbreakable. Typically, the strength of the indirect bond or connection produced via the principles of the invention is greater than that of the basic materials themselves; that is, in a rupture test, the point of rupture or fracture occurs within one of the parts abutting against the bond or contact area and not in such bond itself.

German Publication Application (DT-OS) No. 2,460,207 suggests indirectly joining two parts by the use of double layer metal coatings having a thickness of about 5.5 nm to 22 nm. However, in such prior art indirect connection, the metal coatings are interconnected with one another by "bursting-on" and not by welding. Such "burst-on" method, known from optics for joining glass components, provides a detachable or severable connection so that it cannot be compared with the undetachable bond or connection achieved via the invention. With the burst-on technique, the surfaces of such metal layers must be as planar and parallel as possible so that when such surfaces are brought into contact with one another under properly clean conditions, such layers firmly adhere to each other via adhesive forces. However, the bonds or connections produced with the burst-on method remain severable even after prolonged periods of time, that is, such metal layers do not become permanently bonded to each other. Presumably, this may be attributed to the fact that the burst-on technique must be accomplished manually, outside a vacuum, while welded connections can only be produced inside a vacuum chamber, with the surfaces of the metal coatings to be joined being free from any oxide films or the like.

In the practice of the invention, metal coatings composed of titanium and chromium are advantageously utilized since these metals adhere particularly well on the surfaces of parts to be connected. Single layer metal coatings composed of titanium or chromium may be utilized, especially when no special emphasis, in respect to good electrical conductivity or low acoustical impedance, is placed on the bond.

In preferred embodiments of the invention, a two-layer metal coating consisting of a lower adhesive layer and an upper connective layer are applied to each surface to be bonded or joined. Such two layer metal coatings may be selected in such a manner that the adhesive layer exhibits particularly good adhesion to the connective surface of the part or component to be joined and the connective layer provides a particularly strong welded bond. In preferred embodiments of this invention, the adhesive layer is applied in a thickness ranging between about 0.5 nm to 5 nm and the connective layer is applied in a thickness ranging between about 5 nm and 50 nm. Further, such adhesive layer is preferably composed of a metal selected from the group consisting of titanium and chromium, and such connective layer is preferably composed of a metal selected from the group consisting of gold, silver, platinum, copper, aluminum and indium. Chromium or titanium layers provide excellent adhesion to connecting surfaces while gold, silver, platinum, copper, aluminum or indium layers exhibit excellent weldability. Depending on the requirements of a given structure or component, it is possible to select, for the connective layer, a metal, for example such as silver or gold, which exhibits good electrical conductivity or a metal, such as silver, copper or aluminum which exhibits particularly low sound absorption characteristics.

In further preferred embodiments of the invention, the connective surfaces of the parts to be joined are machined into a planeness of less than 1 micron and a roughness depth (i.e. an average valley-to-peak dimension) of less than 0.1 microns. Such surface preparation provides a surface contact for the metal coatings, in the micro-range and this provides a particularly strong welded connection.

The parts to be connected via the principles of the invention may be somewhat compressed during contacting of the metal coatings at a pressure of up to about 10 N/cm$^2$ so that a better surface-like contact and thus an improved welding of such parts results, particularly in instances where such parts are composed of relatively thin elastic members. Further, such relatively low pressure may compensate for any unevenness of the surfaces to be connected.

Preferably, the welding of metal coatings, in accordance with the principles of the invention is carried out at room temperatures. In this manner, any tension which may occur during cooling of parts having different coefficients of heat expansion are equalized.

In certain embodiments, an intermediate layer, having a maximum thickness of 100 nm and composed of a lead-free glass, may be applied in vacuum, onto the connective surfaces of the parts to be joined prior to the application of the metallic coatings. Such intermediate layer functions as a diffusion blocking means and prevents harmful substances, possibly present in the respective parts, from diffusing into the metal coatings. Such harmful or undesired substances might inhibit or complicate the bonding of the metal layers to one another. For example, such a harmful substance is lead, which is present for example in a part composed of lead molybdate, lead glass or in certain piezo-ceramic materials. The lead-free glass intermediate layer also prevents the diffusion of metal atoms or ions from the metal coatings (after the bond is formed) into one or both of the connecting parts, which might weaken or sever the formed bond. Thus the lead-free glass layer blocks diffusion and aids in providing a particularly durable, safe and strong indirect bond. Further details relevant to such intermediate lead-free glass layer are set forth in our companion co-pending application Ser. No. 928,684 filed concurrently herewith and, which is incorporated herein by reference, now U.S. Pat. No. 4,196,837.

BRIEF DESCRIPTION OF THE DRAWINGS

FIGS. 5 and 6 are elevated cross-sectional views of two parts to be indirectly joined to one another via the principles of the invention; and FIGS. 7 and 8 are elevated somewhat schematic simplified views, partially in phantom, of arrangements utilized during the practice of another embodiment of the invention.

DESCRIPTION OF THE PREFERRED EMBODIMENTS

Figure 1:
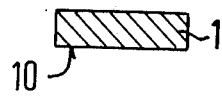
FIGS. 1 and 2 are elevated cross-sectional views of two parts to be indirectly joined with one another via the principles of the invention.
Figure 2:
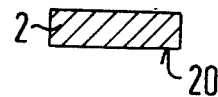

Certain components or parts, such as part 1 shown at FIG. 1 and part 2 shown at FIG. 2, must be connected or bonded indirectly to one another because any direct connection between such parts is impossible. Such a requirement for indirect bonding results, for example, when parts 1 and 2 are composed of materials which cannot be amalgamated with one another or cannot be soldered to one another.

Figure 3:
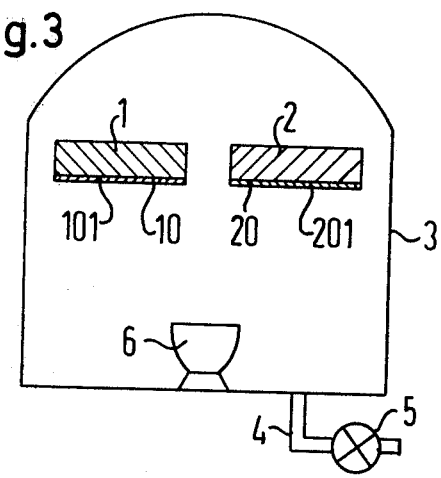
FIGS. 3 and 4 are elevated somewhat schematic simplified views of arrangements utilized during the practice of an embodiment of the invention.

In order to establish an indirect bond between such parts or components, select connecting surfaces, such as surface 10 of part 1 and surface 20 of part 2 are first machined plane and smooth by known grinding and/or lapping techniques. Preferably, such connecting surfaces are worked until a planeness of less than about 1 micron and a roughness depth (i.e. average valley-to-peak dimension) of less than about 0.1 microns has been achieved. Thereafter the parts having such plane and smooth surfaces are suitably positioned within a vacuum housing 3, which, as shown at FIG. 3, is operationally coupled via line 4 to a vacuum pump means 5 so that a vacuum can be provided about such parts. A crucible means 6 containing a select metal, such as titanium or chromium, is positioned within the housing 3 so as to be in operational relation with the parts 1 and 2, particularly the surfaces 10 and 20 thereof. Thereafter, the crucible 6 is heated (by means not shown) to produce metal vapor which is deposited on the connecting surfaces 10 and 20 of parts 1 and 2 and thereby form metal layers 101 and 201 respectively. In accordance with the principles of the invention the metal layers 101 and 201 are formed so as to have a substantially uniform thickness of at least 0.5 nm and not more than 55 nm. The evaporation or vaporization of the select metal in crucible 6 may be accomplished by various means, such as an electron beam or other suitable means. Further, the metal layers 101 and 201 may also be produced via well known sputtering technique instead of vaporization as just described. In a preferred exemplary embodiment, the metal layers 101 and 201 were composed of titanium and had a thickness of about 5 nm.

Figure 4:
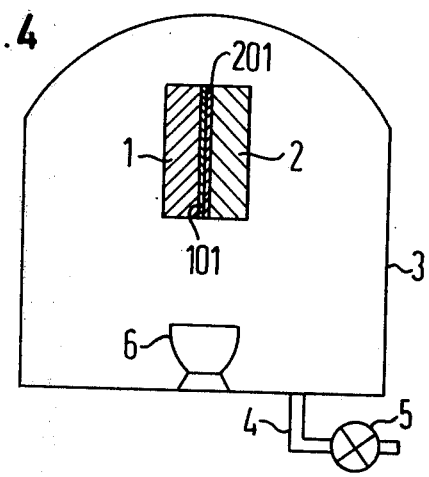

After the metal layers 101 and 201 have been suitably formed, as by vapor deposition or sputtering, components 1 and 2 are brought into contact with each other along the free surface of such metal layers, such as shown in FIG. 4, without disruption or other altering of the vacuum conditions within housing 3. In this manner, the metal layers or coatings 101 and 201 directly contact each other under very clean conditions. As soon as an intimate contact is established, the metal coatings, 101 and 201 become permanently bonded with one another and thus provide a permanent indirect bond or connection between the parts or components 1 and 2. After this bonding step is completed, the vacuum within housing 3 is vented so that the now joined parts 1 and 2 can be removed from the housing for further processing as desired.

FIG. 5 illustrates a component, such as an acousto-optical building component 7, for example composed of lead glass, which may form a part of an acoustical light deflection system and, for that purpose, may be connected with another component or part, such as a piezo-electric crystal 8 shown at FIG. 6.

In order to establish a stable and durable connection or bond, select surfaces, such as 70 and 80 of the respective parts 7 and 8 are prepared by known lapping and grinding techniques to a planeness of at least about 1 micron and preferably to a planeness of about 2 to 3 Newton rings. After careful cleansing of the connecting surfaces 70 and 80, the parts 7 and 8 are arranged as shown in FIG. 7 within an operational vacuum housing 9 (shown in phantom by dash - dot lines).

During operation inside the vacuum housing 9, a lead-free glass is vapor deposited or sputtered onto surface 7 from a suitable source thereof (not shown) so as to form a substantially uniform first layer 701 on surface 70 of part 7. In an exemplary embodiment, layer 701 was uniformly applied so as to have a thickness of about 75 nm. As explained earlier, such lead-free glass layer 701 acts as a diffusion blocking means and prevents the lead in part 7 (in the embodiment herein under discussion, part 7 is composed of lead glass) from diffusing out of part 7 and into the to be formed bond area. Diffusion of lead into the bond or connecting area might complicate or even inhibit the formation of a permanent bond. In the event that part 8 is composed of a piezo ceramic material which contains lead, suchas for example lead-zirconium titanate, a layer of lead-free glass (not shown) similar to layer 701 may also be applied onto the connecting surface 80 of part 8.

After the application of diffusion blocking layers, such as layer 701, adhesive layers 702 and 802 composed, for example, of titanium and having a substantially uniform thickness of about 2 nm respectively, are vapor deposited or sputtered substantially simultaneously onto the connecting surfaces of parts 7 and 8 from a suitable source thereof (not shown). Subsequently, in the maintained Vacuum-conditions without ventilation of the vacuum-chambers connecting layers 703 and 803 composed of, for example, gold and having a thickness of about 10 nm respectively, are substantially simultaneously applied onto the free surface of layers 702 and 802 from a suitable source (not shown). In this manner, part 7 is provided with a two-layer metal coating 704 and part 8 is provided with a two-layer metal coating 804.

After the application of the respective metal coatings 704 and 804, parts 7 and 8 are suitably brought into contact with one another, such as shown at FIG. 8, within the vacuum housing 9. This occurs without any disruption or alterations of the vacuum condition within housing 9 and at room temperature in such a fashion that the free surfaces of the respective connecting layers 703 and 803 are brought into contact with one another. In order to intensify such contact and to equalize any slight surface unevenness that may be present, a pressure (schematically illustrated by opposing arrows labeled P) in the order of magnitude of about 5 N/cm$^2$ (Newtons per square centimeter) is applied on parts 7 and 8. As soon as the connecting layers 703 and 803 come into contact with one another, they become laminarly bonded so that an undetachable and indirect connection of parts 7 and 8 results. Thereafter, the joined parts are removed from the vacuum housing 9 and processed further as desired. For example, in order to complete an acoustical light deflection arrangement, all that is necessary is to then provide electrodes for contacting with a suitable power source, for example by further vapor deposition or sputtering of a select metal onto appropriate areas of the joined components illustrated at FIG. 8.

The method of the invention is ideally suitable for the production of acousto-optical building components because the extremely thin metal coatings utilized for the indirect bonding or connection substantially do not absorb any sound. However, the method of the invention is also useful in other instances where a direct connection between parts is impossible. By proceeding in accordance with the principles of the invention, a vacuum and pressure tight indirect connection between such parts is readily provided. For example, windows made from quartz glass, filter glass or crystal can be indirectly bonded in a vacuum-tight manner to glass ceramic or metal surfaces. Similarly, in the production of pressure measuring devices, diaphragms may be indirectly connected to housings or to the measurement body. Further, indirectly connections or bonds produced in accordance with the invention between parts composed of materials having different coefficients of heat expansion are tension free since such connections are formed at room temperatures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting in the present invention, except as it is set forth and defined in the hereto-appended claims.

We claim as our invention:

1. In a method of indirectly connecting two parts in a vacuum-tight manner whereby metal layers are applied under vacuum to surfaces of such parts to be connected and free surfaces of such metal layers are brought into contact with one another under vacuum, the improvement comprising:

applying said metal layers onto surfaces of such parts to be joined so that such layers have a thickness in the range of about 0.5 to 55 nm; and maintaining such applied layers at about room temperature and under vacuum conditions while substantially simultaneously applying a pressure of up to about 10 N/cm$^2$ onto such parts to force free surfaces of said metal layers into intimate contact with one another.

2. In a method as defined in claim 1 wherein said metal layers are composed of a metal selected from a group consisting of titanium and chromium.

3. In a method as defined in claim 1 wherein applying said metal layers comprises applying a lower adhesive metal layer and applying an upper connecting metal layer.

4. In a method as defined in claim 3 wherein said lower adhesive metal layer is applied in a layer thickness ranging between about 0.5 to 5 nm and said upper connecting metal layer is applied in a layer thickness ranging between about 5 to 50 nm.

5. In a method as defined in claim 3 wherein said lower adhesive metal layer is composed of a metal selected from a group consisting of titanium and chromium and said upper connective metal layer is composed of a metal selected from a group consisting of gold, silver, platinum, copper, aluminum and indium.

6. In a method as defined in claim 1 wherein the surfaces of the parts to be joined are, prior to application of said metal layers thereto, machined to a planeness of less than about 1 micron and a roughness depth of less than about 0.1 micron.

7. In a method of indirectly connecting two parts whereby metal layers are applied under vacuum to surfaces of such parts to be connected and free surfaces of such metal layers are brought into contact with one another under vacuum, the improvement comprising:

providing, under vacuum conditions and prior to the application of said metal layers, an intermediate layer composed of lead-free glass and having a maximum thickness of about 100 nm onto a surface of at least one of said parts to be connected; and applying said metal layers onto surfaces of said parts to be connected so that such metal layers have a thickness in range of about 0.5 to 55 nm.

* * * * *